(12) United States Patent
Vanderlee

(10) Patent No.: US 10,032,466 B1
(45) Date of Patent: Jul. 24, 2018

(54) SUSPENSION VIBRATION DAMPER WITH INTERNAL METAL LAYER

(71) Applicant: Magnecomp Corporation, Murrieta, CA (US)

(72) Inventor: Keith A. Vanderlee, Austin, TX (US)

(73) Assignee: Magnecomp Corporation, Murrieta, CA (US)

( * ) Notice: Subject to any disclaimer, the term of this patent is extended or adjusted under 35 U.S.C. 154(b) by 0 days.

(21) Appl. No.: 15/340,208

(22) Filed: Nov. 1, 2016

Related U.S. Application Data

(60) Provisional application No. 62/258,932, filed on Nov. 23, 2015.

(51) Int. Cl.
| | |
|---|---|
| *G11B 5/48* | (2006.01) |
| *G11B 3/18* | (2006.01) |
| *B32B 27/08* | (2006.01) |
| *B32B 7/12* | (2006.01) |
| *B32B 37/26* | (2006.01) |
| *B32B 37/12* | (2006.01) |
| *F16F 15/04* | (2006.01) |
| *G11B 3/12* | (2006.01) |

(52) U.S. Cl.
CPC ............... *G11B 3/18* (2013.01); *B32B 7/12* (2013.01); *B32B 27/08* (2013.01); *B32B 37/12* (2013.01); *B32B 37/26* (2013.01); *F16F 15/04* (2013.01); *G11B 3/124* (2013.01); *G11B 5/4833* (2013.01); *B32B 2037/268* (2013.01); *B32B 2255/10* (2013.01); *B32B 2255/205* (2013.01); *B32B 2307/56* (2013.01); *B32B 2311/24* (2013.01); *B32B 2323/04* (2013.01); *B32B 2367/00* (2013.01); *B32B 2457/00* (2013.01); *F16F 2224/02* (2013.01); *F16F 2226/02* (2013.01); *F16F 2226/042* (2013.01)

(58) Field of Classification Search
None
See application file for complete search history.

(56) References Cited

U.S. PATENT DOCUMENTS

| | | | |
|---|---|---|---|
| 3,697,350 A | 10/1972 | Yamanouchi et al. | |
| 6,309,985 B1 * | 10/2001 | Virnelson | ............... B32B 25/14 442/104 |
| 7,199,970 B2 * | 4/2007 | Boss | ............... G11B 25/043 360/97.19 |
| 8,142,671 B1 | 3/2012 | Pan | |
| 8,377,553 B2 * | 2/2013 | Xiao | ............... B32B 15/06 156/249 |

(Continued)

FOREIGN PATENT DOCUMENTS

| | | | | |
|---|---|---|---|---|
| JP | 2001082537 A | * | 3/2001 | ............. F16F 9/306 |
| JP | WO 0114766 A1 | * | 3/2001 | ............. F16F 9/306 |
| WO | WO-2006097236 A1 | * | 9/2006 | ............. H01R 39/26 |

*Primary Examiner* — William J Klimowicz
(74) *Attorney, Agent, or Firm* — Nixon Peabody LLP

(57) ABSTRACT

A vibration damper for a disk drive suspension includes a viscoelastic damping layer, a substantially stiffer polymer constraining layer, and a metal layer interposed between the viscoelastic layer and the polymer constraining layer, such as a thin layer of aluminum vapor deposited onto the polymer constraining layer. The metal layer hides irregularities in the viscoelastic layer as that viscoelastic layer is adhered to the suspension without introducing potentially contaminating mineral particles into the polymer constraining layer.

18 Claims, 1 Drawing Sheet

(56) References Cited

U.S. PATENT DOCUMENTS

| | | | | |
|---|---|---|---|---|
| 2009/0002881 | A1* | 1/2009 | Boss | G11B 25/043 360/97.19 |
| 2009/0145541 | A1* | 6/2009 | Xiao | B32B 15/06 156/249 |
| 2009/0252989 | A1* | 10/2009 | Swanson | B32B 15/043 428/699 |

* cited by examiner

SUSPENSION VIBRATION DAMPER WITH INTERNAL METAL LAYER

CROSS-REFERENCE TO RELATED APPLICATIONS

This application claims priority from U.S. Provisional Patent Application No. 62/258,932 filed Nov. 23, 2015, which is incorporated by reference as if set forth fully herein.

BACKGROUND OF THE INVENTION

1. Field of the Invention

This invention relates to the field of suspensions for disk drives. More particularly, this invention relates to the field of a vibration damper for a disk drive suspension, the damper having an internal metal layer.

2. Description of Related Art

Vibration dampers for disk drive suspensions are well known. U.S. Pat. No. 8,142,671 to Pan, for example, shows a disk drive suspension having a constrained-layer damper that comprises two layers: a constraining layer and a damping layer. The damping is typically a viscoelastic material, and the constraining layer is typically a material having a considerably higher stiffness than the damping layer, such as stainless steel, or a polymer film such as polyimide or polyester.

Dampers having polyester film constraining layers (PFCLs) are popular. The polyester film generally comes in two forms: clear polyester which is the normal pure material form, and opaque polyester that has been rendered opaque by adding mineral powders such as barium sulfate.

For the clear PFCL, the appearance of the damper is highly variable. There can be small bubbles, irregular appearance of the bonding surface, refracted light patterns from small irregularities at the bonding interface, and small entrapped debris. None of these conditions is detrimental to the vibration damping performance of the damper, but disk drive manufacturers are often unsatisfied with the appearance of these dampers and sometimes claim to the suspension supplier that defects exist in the suspension when no functional defects actually exist.

The mineral-filled PFCL solves the problem described above by creating an opaque PFCL. For the mineral-filled PFCL, however, disk drive manufacturers are turning away from these materials because the filler materials can be released from the film at cut edges while inside the disk drive thus contaminating the drive. These filler particles released from the cut edges have been shown to cause disk drive failures.

For both types of PFCL dampers, disk drive manufacturers want to increase the damping capacity of the dampers. This can most easily be done by adding mass to the PFCL.

SUMMARY OF THE INVENTION

The present invention is of a disk drive suspension damper having the two standard layers of a damping material such as a viscoelastic material and constraining layer such as polymer film, and also having a layer of metal included between the damping material and the constraining layer.

This metal layer achieves at least two advantages. First, it produces an opaque layer in the middle of the damper. This visually hides non-functional irregularities of the types described above in the viscoelastic layer and the bonded interface to the suspension, that would be otherwise visible when the constraining layer and the damping layer are transparent or translucent, i.e., when those layers are light-transmitting. The visual appearance of the damper is thus greatly improved, and customer satisfaction with the appearance is concomitantly also improved.

Second, the addition of the metal layer adds mass to the damper. This additional mass increases the damping capacity of the damper.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 1:
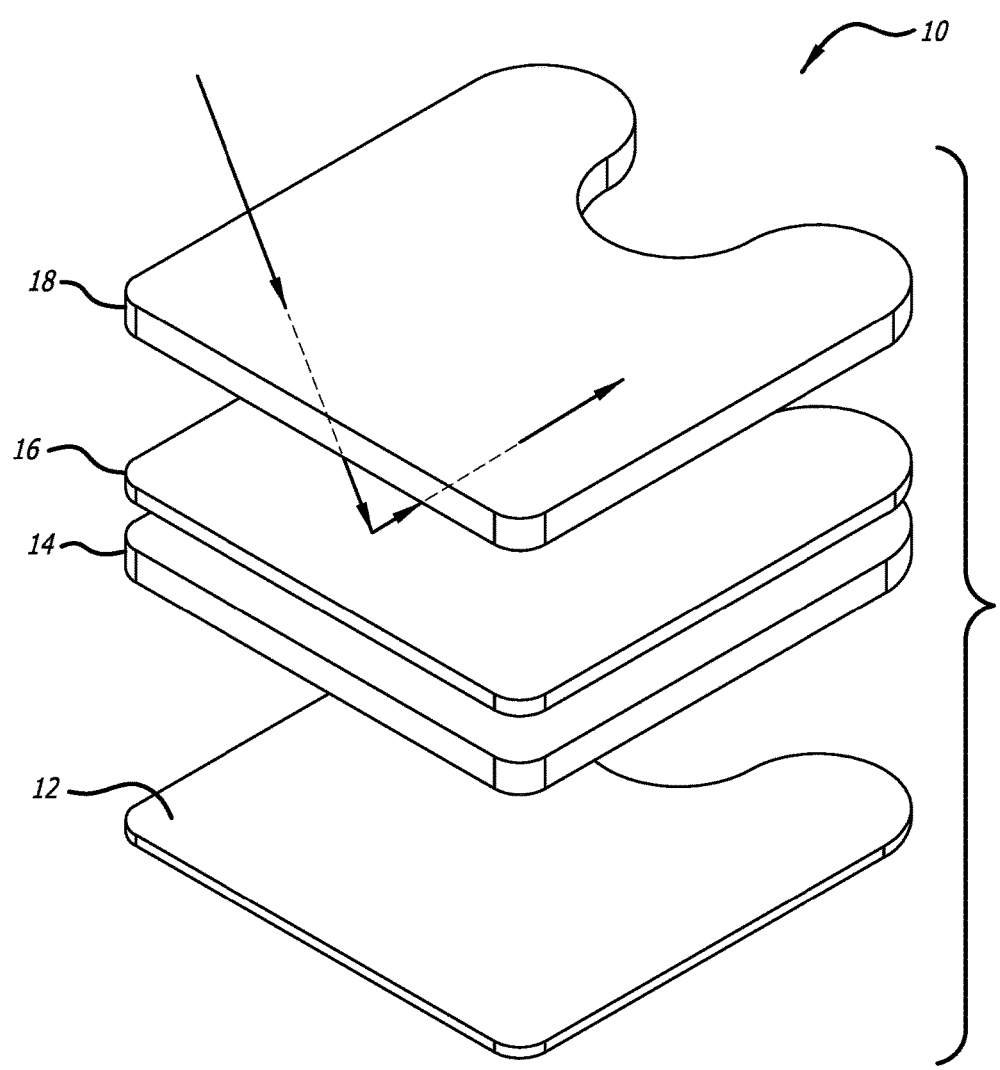
FIG. 1 is an oblique exploded view showing a suspension vibration damper having an internal metal layer according to an exemplary embodiment of the invention.

FIG. 1 is an oblique exploded view showing a suspension vibration damper 10 according to an exemplary embodiment of the invention. Vibration damper 10 includes a polymer film constraining layer (PFCL) 18, a metal layer 16, a viscoelastic polymer 14, and an adhesive release liner 12. Release liner 12 is loosely adhered to the viscoelastic layer 14 so that it can be easily removed to expose a contact adhesive on the viscoelastic layer. In the exemplary embodiment the polymer film constraining layer 18 is Mylar A polyester film having a thickness of 0.127 mm; metal layer 16 is a thin aluminum layer; the viscoelastic polymer 14 is 0.050 mm thick; and the release liner 12 is polyethylene having a thickness of 0.10 mm. As shown by the arrow, light impinges onto damper 10, penetrates through polymer film constraining layer 18, reflects off of metal layer 16, and exits back through polymer film constraining layer 18.

The constraining layer preferably has a Young's modulus of 0.5-10 Gpa, and more preferably a Young's modulus of 2-6 GPa. Mylar A has a Young's modulus of 3.5 GPa. The constraining layer is considerably stiffer than the viscoelastic material, such as having a Young's modulus of at least 10 times the Young's modulus of the viscoelastic layer.

In an exemplary construction technique, aluminum layer 16 was vapor deposited onto one side of PFCL 18. PFCL 18 was then laminated to the viscoelastic adhesive 14 which is carried on the removable liner material 12. This construction is produced in long rolls of laminate tape. Finished dampers 10 are cut from this laminate tape using conventional stamping dies. The dampers can be die cut in the tape as that tape is supplied to the assembler, with the individual dies removed from the tape as those dampers are ready to be applied.

Release liner 12 is peeled away from damper 10 after cutting and discarded, and then a human being or a robotic placement machine places the damper 10 on the disk drive suspension. Damper 10 in the assembled suspension includes damping layer 14 adhered to the suspension body by adhesive, metal layer 16, and constraining layer 18. Metal layer 16 is sandwiched between damping layer 14 and constraining layer 18.

More generally, metal layer 16 could be any opaque or nearly opaque layer, although vapor-deposited metal is well suited for use in the invention due to the ability to produce a very thin yet opaque layer of such vapor-deposited metal on the PFCL. Preferably the metal layer is less than 5 μm thick.

In addition to the vapor deposition in the exemplary embodiment, other methods of producing the metal layer between the PFCL and the viscoelastic adhesive layer are possible, including laminating separate layers, electroplating, sputtering, and other know processes.

The PFCL can be made from other polymers such as polyolefin, polycarbonate, vinyl, and other polymer films.

Many types of metal other than aluminum can be used including gold, nickel, copper, and others.

In addition to die cutting, other methods of cutting the laminate damper tape into individual dampers are possible including, but not limited to, laser cutting, rotary die cutting, water jet cutting, and slitting.

I claim:

1. A vibration damper for a disk drive suspension, the vibration damper comprising:
   a transparent or translucent viscoelastic damping layer;
   a transparent or translucent constraining layer, the constraining layer being significantly stiffer than the damping layer; and
   an opaque layer interposed between the damping layer and the constraining layer, the opaque layer comprising a material that is different from the damping layer and the constraining layer.

2. The vibration damper of claim 1 wherein the opaque layer comprises metal.

3. The vibration damper of claim 1 wherein the constraining layer has a Young's modulus of greater than 2 GPa.

4. The vibration damper of claim 1 wherein the opaque layer is a metal selected from the group consisting of aluminum, copper, gold, and nickel.

5. The vibration damper of claim 1 wherein:
   the viscoelastic damping layer comprises polymer;
   the constraining layer comprises clear polymer film; and
   the opaque layer is a vapor-deposited metal.

6. The vibration damper of claim 1 wherein the opaque layer was vapor-deposited onto the constraining layer.

7. The vibration damper of claim 1 wherein the damper is part of an elongate laminate tape, the laminate tape containing a plurality of dampers.

8. The vibration damper of claim 1 further comprising a release liner loosely adhered to the viscoelastic damping layer, and a contact adhesive between the release liner and the viscoelastic damping layer.

9. In combination, the vibration damper of claim 1 and said disk drive suspension, the vibration damper being adhered to the suspension.

10. A vibration damper for a disk drive suspension, the vibration damper comprising:
    a transparent or translucent damping layer;
    a transparent or translucent constraining layer, the constraining layer being significantly stiffer than the damping layer; and
    a metal layer interposed between the damping layer and the constraining layer.

11. The vibration damper of claim 10 wherein the metal layer is opaque.

12. The vibration damper of claim 10 wherein the metal layer is a vapor-deposited metal layer.

13. The vibration damper of claim 10 wherein the metal layer comprises aluminum.

14. The vibration damper of claim 10 wherein the metal layer is selected from the group consisting of aluminum, copper, gold, and nickel, and is less than 5 μm thick.

15. The vibration damper of claim 10 wherein the metal was deposited on one of the damping layer and the constraining layer by a method selected from the group consisting of vapor deposition, electroplating, and sputtering.

16. The vibration damper of claim 10 further comprising a release liner on the damping layer.

17. The vibration damper of claim 10 wherein the damping layer comprises a viscoelastic material.

18. In combination, the vibration damper of claim 10 and said disk drive suspension, the vibration damper being adhered to the suspension.

* * * * *